Dec. 14, 1948. L. L. TIRRELL Re. 23,064
METHOD AND APPARATUS FOR SAND BLASTING
Original Filed Feb. 25, 1937 2 Sheets-Sheet 1
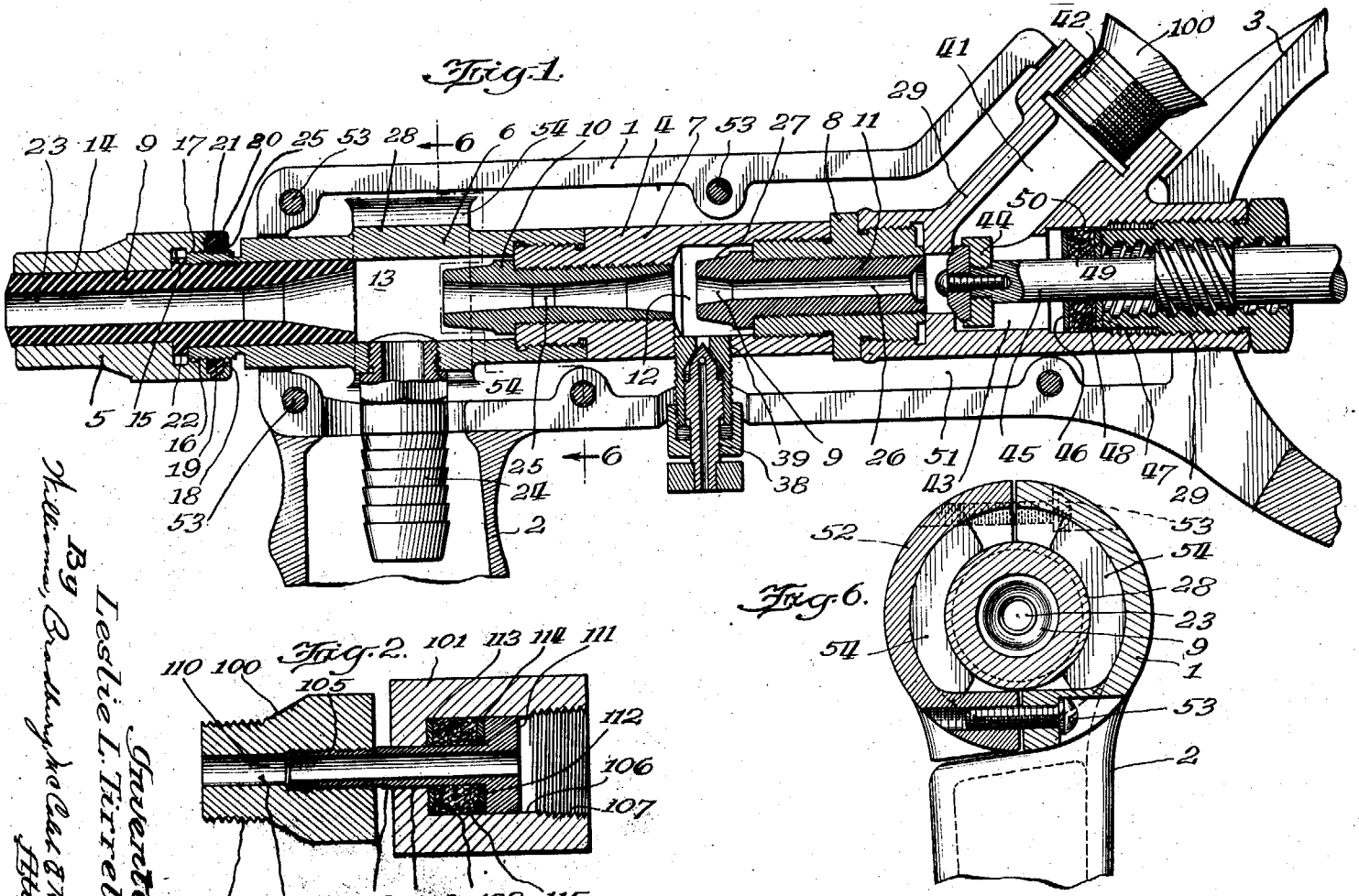
Inventor.
Leslie L. Tirrell
By
Williams, Bradbury, McCaleb & Hinkle,
Attys.

Dec. 14, 1948. L. L. TIRRELL Re. 23,064

METHOD AND APPARATUS FOR SAND BLASTING

Original Filed Feb. 25, 1937 2 Sheets-Sheet 2

Inventor
Leslie L. Tirrell
By Williams, Bradbury, McCaleb & Hinkle
Attys

Reissued Dec. 14, 1948 Re. 23,064

UNITED STATES PATENT OFFICE 23,064

METHOD AND APPARATUS FOR SANDBLASTING

Leslie L. Tirrell, Benton Harbor, Mich., assignor to The Hydroblast Corporation, Chicago, Ill., a corporation of Illinois Original No. 2,200,587, dated May 14, 1940, Serial No. 127,620, February 25, 1937. Application for reissue August 12, 1948, Serial No. 43,841

27 Claims. (Cl. 51—8)

This invention relates to a method and apparatus for sand blasting devices, and more particularly to a method and apparatus for cleaning by abrasion which includes means whereby surfaces are abraded with a wet abrasive by the introduction of a supply of air and abrasive into a water stream, operated under high pressure.

The present application is a continuation in part of my earlier application, Serial No. 37,585, filed August 23, 1935, which has now become abandoned.

The main object of my invention is to provide a method and apparatus for sand blasting which utilizes a liquid carrying medium for projecting abrasive material at high velocity and entrains a large amount of the abrasive material in concentrated and forceful stream.

Another object of my invention is to provide apparatus and a method for controlling the spread of a projected stream of liquid carrying medium, such as water, having sand or other abrasive material entrained therein whereby the stream may be varied from a thin concentrated pencil to a wide spray.

A further object is to provide a method and apparatus for abrading in which particles and air are fed to separate chambers of a gun through depressions in air pressure created in said chamber by fluid jets passing through each chamber from a nozzle of one cross sectional area to a nozzle of greater cross sectional area.

A further object is to effect controllable confinement of a projected liquid stream by securing the entrainment of highly rarefied air thoroughly and substantially equally distributed within the stream, for the accomplishment of which I use two nozzles in tandem behind the final discharge nozzle and admit air in controlled amounts to the stream as it passes between said tandem nozzles.

A further object is to provide a simple method and means for cleaning the abrading material from the gun, piping, and feeder.

A further object is to provide a cut-off valve for the water stream with a self-sealing packing gland which needs no tightening or other adjustment.

A further object is to provide a self-sealing swivel joint for the high pressure water line, a feature of this joint being that it compensates for wear on the packing material without hand adjustment and constantly assumes the minimum degree of resistance to turning consistent with the pressure against which it is required to maintain a seal.

A further object is to provide the discharge nozzle retaining sleeve with means for cleaning the thread of the gun body when the two are screwed together.

A further object is to provide a method and apparatus for cleaning by abrasion in which the abrasive, after a cleaning operation, may be collected, classified, and recirculated through the machine.

Another object of my invention is to provide a process and apparatus for cutting coherent solids which reclaims and utilizes particles cut from the solid as abrading material.

A further object is to provide a feeder in connection with the collecting means for the used sand or particles, and in which a suction is created by the gun for lifting the sand from the collecting means.

A further object is to provide means within the feeder for keeping the sand and water in a mobile condition and to provide easy starting of the gun after a period of inoperation.

With the above and other objects in view the invention resides in the method together with the combination and arrangement of parts as hereinafter set forth, shown in the drawings, described and claimed, it being understood that changes in the precise embodiment of the invention may be made within the scope of what is claimed without departing from the spirit of the invention.

In the drawings:

Fig. 1 is a vertical longitudinal sectional view of the gun;

Fig. 2 is a vertical longitudinal sectional view of the swivel joint between the inlet water hose and the gun;

Fig. 6 is a sectional view of the gun cut along the line 6—6 of Fig. 1.

Figure 3:
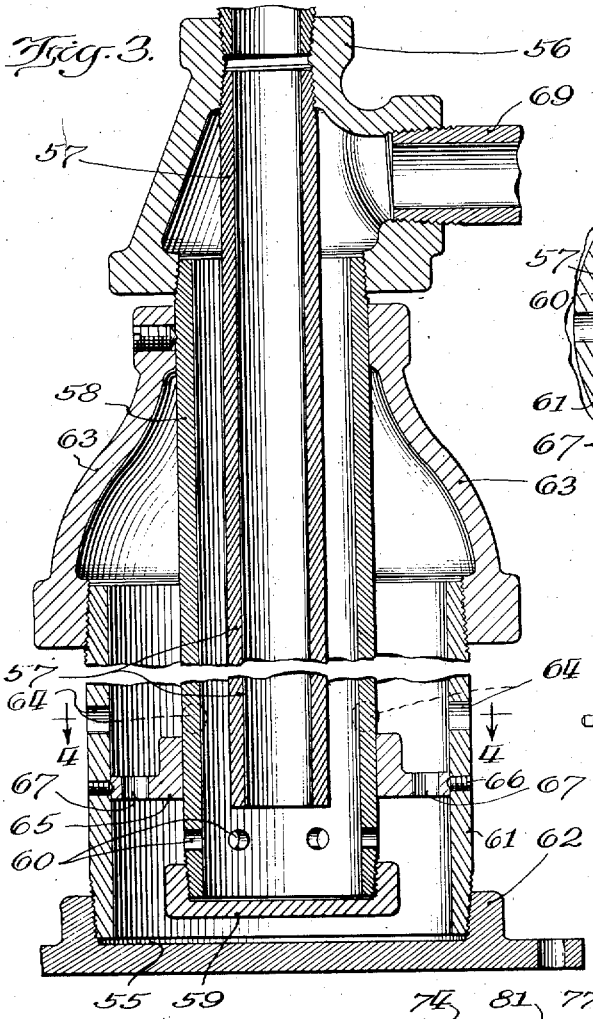
Fig. 3 is a vertical longitudinal sectional view of the feeder.

Referring to the drawings, and particularly to Fig. 1, which shows the gun as a whole, the gun comprises an elongated casing 1 fitted with a hand grip 2 at the forward end and an arm rest 3 at the rear. Inside this casing is a tube 4 made up of the axially aligned sections 5, 6, 7, 8, and 29. Inside the tube 4 are arranged three tandem nozzles, 9, 10, and 11, in spaced relationship to each other so that a chamber 12 is provided inside the tube 4 between the rear nozzle 11 and the intermediate nozzle 10 and another chamber 13 is provided between the intermediate nozzle 10 and the front nozzle 9.

The opening in the intermediate nozzle 10 is larger than that in the rear nozzle 11, but smaller than the opening in the front nozzle 9. Therefore, it will be seen that as the high pressure fluid stream leaves the rear nozzle 11 and passes through the chamber 12 and intermediate nozzle 10, no back pressure will result since the natural expansion of the stream is compensated for by the increased cross-sectional area of the middle nozzle 10. In a like manner the increased diameter of the stream as it passes from the middle nozzle 10 to the front nozzle 9 is provided for by the larger opening in the front nozzle 9. A nozzle casing 5 forms the holder for the resilient discharge nozzle 9 and consists of a sleeve with a forward cut-away section of reduced diameter, an axial hole 14 through the sleeve to receive the nozzle liner 9, an annular recess 15 to receive the flange of the nozzle liner, an internal thread 16 of larger diameter than the hole 14 that is fitted to a thread 17 of the tube 6, and an annular recess 18 near its rear end containing a rubber ring 19 that clamps against the tube 6 when sections 6 and 5 are screwed together, effectively brushing the thread free from sand and dirt. The recess 18 has one or more holes 20 extending radially outwardly from its circumference, which fit over one or more knobs 21 on the circumference of the rubber ring 19, thereby forcing the ring 19 to revolve with the sleeve 5. The discharge nozzle 9 is of substantially cylindrical section with an external annular ridge 22 near its center and a cylindrical axial hole 23 extending through it.

The hole 23 is tapered outwardly and rearwardly from a point near its rear end. The discharge nozzle 9 is preferably made of rubber or other resilient material since these materials being resilient, are much more resistant to abrasion than are metals. Disposed within the recess 15 and held against the outer end of the tube 6 is the ridge 22 of the nozzle liner 9; therefore, it will be seen that the nozzle liner 9 will not be forced from the gun by the projected abrasive. The wet sand is brought into the gun through a hose connection 24 which opens into the lower side of the chamber 13. Therefore, it will be seen that the course of the sand is through the hose connection 24, chamber 13 and nozzle 9 only, and since the movement of the sand is not rapid until it starts flowing through the nozzle 9, wear is largely restricted to this latter part.

The middle nozzle 10 has a cut-away forward section of reduced diameter, an axial hole 25 of varying diameter, being smallest at a point somewhat forward of its center; it tapers from this point outwardly in both directions.

Axially through the rear nozzle 11 is a hole 26 which tapers outwardly and forwardly from a point near the forward end of the nozzle. The external forward surface of the nozzle 11 tapers at 27 inwardly and forward from about the same position longitudinally that the internal taper begins. The front of the nozzle 11 is somewhat behind the rear of the nozzle 10, forming a chamber 12 between the two in the tube 4. A needle valve 38 of well known design is screwed into a threaded opening 39 leading into the chamber 12 so that by adjusting this valve 38 varying amounts of air can be allowed to flow into the chamber 12.

Connected with the tube 8 at its rear end is the section 29 of irregular shape containing the inlet 41 for water under relatively high pressure, having at its outward end a threaded section 42 for connecting the water hose.

Extending rearwardly through the section 29 is the chamber 43 containing the water inlet valve 44, provided with a knob 96. This valve is of well known design excepting that it has a novel means for sealing the valve stem 45 consisting of two circular washers 46 and 47 that float on the valve stem 45 and contain a quantity of packing substance 48 between them. When the water pressure builds up on the forward side of the washer 46, it moves it rearwardly and compresses the packing 48, since the rear washer 47 is held in place by the forward face of the valve gland 49. This compression of the packing 48 forces it against the valve stem 45 and against the cylindrical surface 50. Therefore, manual adjustment is avoided and the greater the water pressure in the gun, the tighter the packing is compressed, the parts being so proportioned that the water pressure is always sufficient for sealing. With this arrangement rotational friction on the valve stem 45 is always at the minimum for the pressure of the water against which the seal is maintained.

The above working parts of the gun are enclosed within the casing which consists of two main parts. The part 1 is of irregular shape so formed as to have a cavity 51 to take the working parts of the gun. A projection 2 extending downwardly near the front of the gun covers the sand hose for a short distance and serves as a handle to be held in the left hand, and a projection 3 extending rearwardly behind the working parts of the gun is to be held in the crook of the right arm. By thus holding the gun, the recoil in operation is easily absorbed without discomfort. A cover plate 52 is held to the case 1 by means of screws 53, effectively enclosing the working parts of the gun and holding them rigidly in place by means of the pressure of bosses 54 on a ridge 28.

Figure 4:
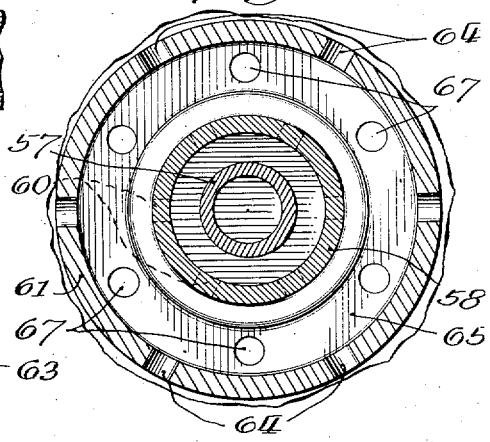
Fig. 4 is a sectional view of the feeder cut along the line 4—4 of Fig. 3.
Figure 5:
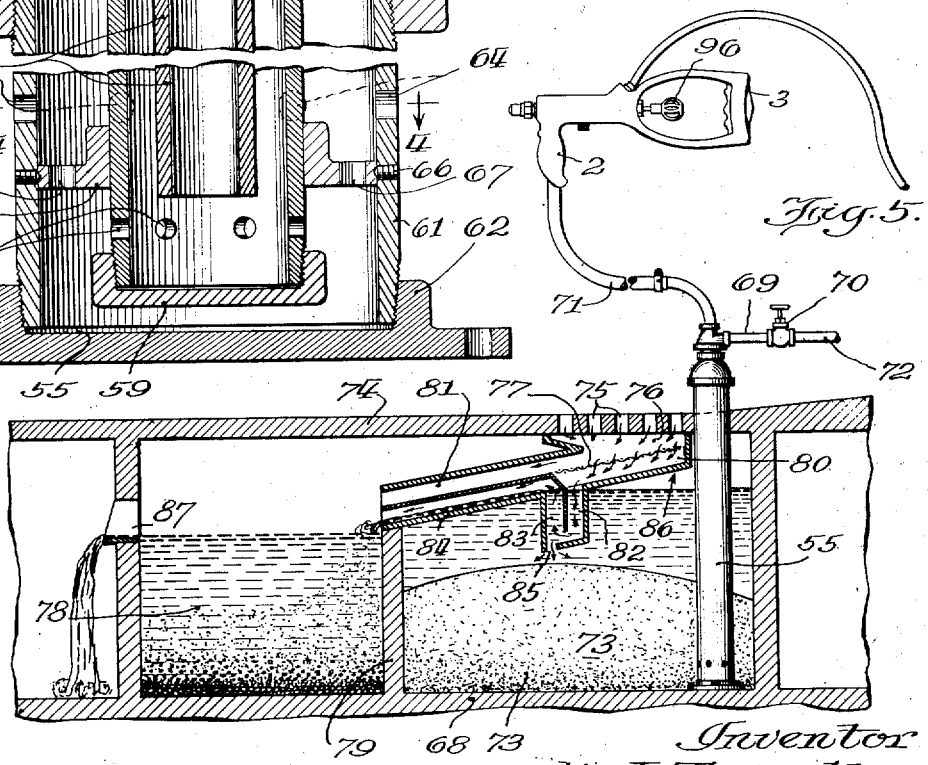
Fig. 5 is a vertical longitudinal sectional view through the platform, and sand classifier, showing the feeder in the tank, and the gun and water supply connected therewith.

In Figs. 3, 4 and 5, the sand feeder 55 consists of a cap 56 provided with a downwardly extending axial tube 57 through which sand is drawn to the hose and thence to the gun. Surrounding this tube is the tube 58 closed at the bottom by the cap 59 and at the top by the cap 56, having a plurality of holes 60 arranged radially around it near the lower end through which the sand and water mixture is drawn. Surrounding this tube 58 is the tube 61 closed at the bottom by the base 62 and sealed against the tube 58 at the top by the cap 63. Arranged radially around the tube 61 are a plurality of holes 64 somewhat closer to the top of the feeder than the holes 60. Located vertically between the two rows of holes 60 and 64 and inside the tube 61, but surrounding the tube 58, is a circular baffle plate 65 held in place by the setscrews 66, with a circular row of vertical holes 67. The holes 64 and 60 are roughly opposite each other on lines drawn radially from the center of the feeder, while the holes 67 are radially spaced so as to come roughly equally between the holes 64 and 60. Of these three sets of holes, the ones on the outside 64 are much the largest while those in the middle 67 are smaller and those in the inside tube 60 are still smaller. It will also be noticed that as the sand and water mixture flows inwardly toward the tube 57, it also flows downwardly since each successive row of holes is lower than the one before it.

The action of the feeder in the tank is as follows. The water seeps through the sand in the tank, through the holes 64, 67 and 60, to a point well above the holes because of the hydrostatic head on the water in the tank 68. However, the sand not acting as a liquid, only a small amount will seep through the holes 64 and fall on the baffle plate 65, and since the holes 67 in the baffle plate 65 are spaced between the holes 64 in the casing, only a very small amount of sand will fall through these holes 67 into the bottom of the feeder. Consequently, when the machine is at rest the sand or other abrasive will not pack around the inlet tube 57.

When the gun is put into operation the suction on the tube 57 draws the water from the feeder which sets up a current through the holes 64, 67 and 60 and draws a slurry of abrasive and water from the tank 68 through these holes and up through the tube 57 to the sand hose and gun. The holes 60 are made small so that the mixture has to move rapidly through them, thereby setting up the necessary current while the holes 64 are much larger so that the sand coming from the sand tank 68 moves relatively slowly into the feeder, thereby preventing a cone to the surface forming around the feeder.

The cap 56 has a connection 69 with an outside water supply communicating with the chamber between the tubes 58 and 57. This water supply is controlled by a valve 70 and is used for flushing sand from the feeder, hose, and gun.

In Fig. 5 the feeder 55 is shown in a sand tank 68. It is connected with the gun by the hose 71 and with a water supply by the pipe 72. In the tank and surrounding the feeder is the wet sand 73. The tank 68 is covered by a platform 74 on which the operator can stand and to which the projected abrasive and abrasive such as core and moulding sand cut or cleaned from the castings is washed by the water from the gun after being projected from the gun. The platform 74 is provided with holes 75 through which the sand and water mixture runs into a hopper 76 of a sand classifier 86. In the hopper 76 of the sand classifier is provided a screen 77 sloping toward a sludge tank 78 which is separated from the sand tank 68 by a partition 79. This screen allows the sand, water and sludge mixture to pass through into a chamber 80 while rejecting larger particles downwardly through a trough 81 and into the sludge tank 78. Communicating with the chamber 80 is a downwardly extending passageway 82 which is open at its bottom to an upwardly extending passageway 83 adjacent thereto. The top of the passageway 83 communicates with a water and sludge trough 84 which slopes downwardly and empties into the sludge tank 78. The bottom of the passageway 83 has an opening 85 in communication with the inside of the sand tank 68.

In operation the sand, water and sludge mixture runs through the holes 75 in the platform 74 and on to the screen where the large particles are separated from the mixture and projected downwardly through the trough 81 and into the sludge tank 78. The sand, water and sludge mixture, freed of the large particles, flows through the screen, downwardly through the chamber 80 and passageway 82 and into the passageway 83. From here the water carrying the sludge flows upwardly through the passageway 83, downwardly through the trough 84 and into the sludge tank 78.

Since the water flowing upwardly in the passageway 83 does not move rapidly enough to carry along the heavier abrasive particles in suspension, these particles settle out and drop through the opening 85 into the sand tank 68 from where they are recirculated through the sand feeder 55, hose 71 and back to the gun.

In the sludge tank 78 the fine sludge and large particles settle and the relatively clear water overflows through the outlet 87 and passes into the sewer.

The pressure in the water hose leading to the gun is relatively high, in the nature of 700 to 1000 pounds to the square inch, which causes the hose to become more or less rigid. Consequently, it is preferred to incorporate a swivel joint between the hose and gun. The swivel joint, Fig. 2, consists of three sections 100, 101 and 102. Section 100 has an external thread 103 on its forward end to fit the gun opening 42 and an axial hole 104, with an internal thread toward the rear end to join it to a stem 105 of the part 102. Part 101 has a cylindrical recess 106 with a thread 107 in the rear to couple with the water hose, an annular face 108 at the bottom of the recess and an axial hole 109 that closely fits the stem 105. Connecting the two sections 101 and 100 is the part 102 which has a long cylindrical stem 105 with a thread on its forward end to fasten rigidly to part 100 by means of the thread in the hole 104, an axial hole 110, and a thickened section at its rear to fit the recess 106 with two annular faces 111 and 112. Between the annular faces 108 and 112 are two washers 113 and 114 that fit closely inside the recess 106 and around the stem 105 having between them a quantity of packing 115. When the water pressure builds up against the face 111 it forces the part 102 and the washer 114 forward, thereby compressing the packing 115 and forcing it outwardly against the wall of the recess 106 and inwardly against the stem. The size of the annular face 111 is so proportioned that the necessary sealing action is obtained while allowing as much freedom of motion to the coupling as is consistent. The greater the pressure against the face 111, the tighter the packing will be compressed, and the more tightly the coupling will seal against leaks. Consequently, no tightening or other adjustment is necessary in order to insure against leaks and still obtain freedom of movement.

The operation of the machine is as follows: When the high pressure water hose and sand hose are connected to the gun, the operator grasps the handle 2 in his left hand, holds the stock 3 in the crook of his right arm and opens the water valve 44 by turning the knob 96. The water flows through the opening 41, past the valve 44 and through the rear nozzle 11. It comes out of this nozzle as a jet which expands somewhat before entering the opening of the nozzle 10. The size of the opening in nozzle 10 is such that the water stream fills it without producing any back pressure. Consequently, since the diameter of the stream leaving the chamber 12 is larger than the diameter of the stream entering the chamber, a depression in air pressure is produced in the chamber 12. Therefore, when the needle valve 38 is opened, air will flow into the chamber 12. This air is drawn along with the water stream and incorporated in it in the form of fine bubbles. Since the needle valve 38 does not admit as much air as the water stream will take up, the air in the chamber 12 is always below atmospheric pressure; consequently, when this rarefied air is incorporated into the water stream in the form of bubbles, these bubbles are of expanded air. When the jet of water and incorporated rarefied air is projected from the middle nozzle 10 into the front nozzle 9, an additional vacuum is produced in the chamber 13, drawing the sand and water mixture from the sand tank through the feeder 55, hose 71, and coupling 24 into the chamber 13, where it is intimately incorporated with the stream of water and rarefied air, the rarefied air aiding the mixing of the sand with the stream. Thus, when the stream is projected from the nozzle at great force, it consists of an intimate mixture of water, sand and rarefied air bubbles.

The normal tendency of a stream of water when projected from a nozzle is to begin to expand and disintegrate as soon as it leaves the nozzle. However, in this stream the tendency to expand is counteracted by the atmospheric pressure around it. That is, as soon as the stream leaves the nozzle 9, the atmospheric pressure around it collapses the air bubbles incorporated in the stream, thereby having a tendency to narrow the stream, the result being that the mixture is projected for a considerable distance as a thin pencil-like jet which has a much greater abrasive action than would be true of an expanded stream. However, if an expanded stream is required for certain kinds of work, it is only necessary to close somewhat the needle valve 38, since by not allowing rarefied air to be incorporated in the stream, the stream expands normally on leaving the gun. Consequently, by merely adjusting the valve 38, the operator can control the character of the stream within wide limits.

After the abrading stream strikes the work it runs to the floor, back through the holes 75 in the platform 74, through the sand classifier 86 where the large particles and sludge are separated from the abrasive as previously described, and into the sand tank 68. From there the water and sand mixture is sucked in through the holes 64, down through the holes 67, in through the holes 60, up through the tube 57, and back to the gun through the hose 71.

When it is desired to put the gun out of operation for a while, the water valve 70 is opened, allowing water to flow into the chamber between the tubes 57 and 58, thereby forcing the sand in this chamber back through the holes 60, 67 and 64 into the sand tank and also up through the tube 57 to the gun, thereby cleaning the feeder, hose and gun of sand. When clear water comes out of the nozzle 9, the apparatus is cleared of sand and the valve 70 may be closed.

When it is desired to put the gun back into operation it is only necessary to open the valve 44 as usual and in a few seconds the system will be filled with sand again.

The invention having been set forth, what is claimed to be new and useful is:

1. An abrading gun comprising an elongated body member with a water intake at one end and a discharge nozzle at the other end of said body member for projecting a fluid stream, a rear nozzle within the body member forwardly of the water intake for creating a high velocity water stream within the body, an intermediate nozzle within the body member between the rear nozzle and the discharge nozzle, said intermediate and rear nozzles having their bores in axial alignment and having chambers around their discharge ends, a supply pipe for supplying a sand slurry to the chamber around the discharge end of the intermediate nozzle under the influence of suction created within said chamber, and means for admitting air to the chamber surrounding the discharge end of the rear nozzle for entrainment in the water stream in advance of the supply of sand slurry to the stream.

2. An abrading gun comprising a body member having a liquid intake end and a fluid discharge end for projecting a stream of fluid, a nozzle forming the fluid discharge end, spaced axially aligned nozzles within the body member having chambers around their discharge ends, means for feeding a sand slurry to the forward chamber, and adjustable means for admitting regulated amounts of air to the rearward chamber for varying the degree of vacuum in the last said chamber, and the degree of rarefication of the air entrained in the projected stream.

3. In a hydraulic abrading gun a system of three nozzles in axial alignment, the rear nozzle and the middle nozzle having chambers around their discharge ends, and adjustable means to admit controlled amounts of air to the chamber around the discharge end of the rear nozzle.

4. In a hydraulic abrading gun, a system of three nozzles in axial alignment the rear nozzle and middle nozzle having chambers around their discharge ends, means for venting the chamber around the discharge end of the rear nozzle to the atmosphere, and valve means in said vent to restrict the passage of air therethrough.

5. In a gun of the class described, means for automatically cleaning the thread of the gun body whenever the nozzle is screwed on the gun, said means consisting of a threaded nozzle containing an annular recess at the outside end of the thread, and an annular rubber ring in the recess, said rubber ring projecting slightly beyond the nozzle thread.

6. The combination with the supply pipe of an abrading gun, of means for feeding the abrading material to the supply pipe, said means comprising an apertured cylinder adapted to be embedded in the abrading material, said supply pipe extending into said cylinder in spaced relation to the inner periphery thereof, and a baffle plate within said cylinder and having openings through which abrading material passes to the supply pipe, all for the purpose of preventing packing of sand in the supply pipe.

7. In combination with an abrading gun, means for feeding the abrading material to a supply pipe, said means comprising an apertured chamber to be embedded in the abrading material, said supply pipe extending into said chamber, and one or more apertured chambers inside the first said chamber so arranged that the abrading material must pass through the last said chamber or chambers before reaching the supply pipe, for the purpose of preventing packing of sand in the supply pipe.

8. A feeder of the class described consisting of a sand pipe; a shell around the sand pipe opening, said shell being closed at the bottom and top and having a plurality of holes around the bottom; a second shell around the first shell, said second shell being closed at the bottom and top, and having holes near the bottom; these last said holes having a greater total area and being higher up than the holes in the first named shell.

9. A feeder of the class described consisting of a sand pipe; a shell around the sand pipe opening, said shell being closed at the bottom and top and having a plurality of holes around the bottom; a second shell around the first shell, said second shell being closed at the bottom and top, and having holes near the bottom, these last said holes having a greater total area and being higher up than the holes in the first named shell; and a connection to an outside water supply between the first and second shells for washing out the feeder, sand hose and gun.

10. The method of preventing packing in a sand hose and sand feeder conveying a sand and water slurry to a hydraulic blast gun which comprises admitting clear water under pressure to the system at such a point that sand is forced backwardly from the feeder and forwardly from the hose and gun, said water under pressure being admitted before the blast gun is shut off and its admission being continued until no more sand is projected from the blast gun, the gun then being shut off before the clear water is shut off.

11. In a hydraulic sand blast gun, a gun body provided with three nozzles in tandem, means to project a high pressure liquid stream through said three nozzles, valve means to admit air between the rear nozzle and the middle nozzle, and means to admit abrasive particles mixed with water between the middle nozzle and the front nozzle.

12. The combination with the supply pipe of a hydraulic abrading gun, of means for feeding a slurry of abrading material to the supply pipe, said means comprising an apertured chamber adapted to be embedded in the wet abrading material, said supply pipe extending into said chamber in spaced relation to the inner periphery thereof, and means to admit a substantially sand free fluid to the feeder between the supply pipe and the chamber wall for washing abrading material from the supply pipe and chamber.

13. In a device of the class described, a gun, a sand supply system comprising a sand supply conduit connected to said gun, a feeder connected to the conduit, said feeder adapted to be inserted in a tank of wet sand to feed a sand slurry therefrom; and means to admit a substantially sand free fluid to the feeder in such a position that sand is washed from the feeder, supply conduit, and gun.

14. In a hydraulic sand blasting device, the combination comprising: an elongated body member having water intake and discharge ends, means to project a high pressure liquid stream through said body member, needle valve means to admit controlled amounts of air to said body member for incorporation in the liquid stream passing therethrough, and means to admit a sand slurry to said body member for incorporation in said liquid stream subsequent to the incorporation of the air in said stream.

15. The method of controlling the spreading of a projected liquid jet which comprises the steps of mixing rarefied air with the liquid before it is finally projected as a jet and adjusting the amount of said air that is mixed with the liquid.

16. The method of projecting abrasive material with a relatively non-compressible fluid carrying medium which comprises the steps of mixing with the relatively non-compressible fluid carrying medium a controlled amount of expansible fluid to provide a relatively porous fluid mixture, then separately mixing abrasive material with the porous fluid mixture and projecting the mixed abrasive and porous fluid.

17. The method of projecting abrasive material comprising the steps of subjecting a supply of liquid carrying medium to high pressure, restricting the flow of the said liquid carrying medium to a high velocity jet, passing said jet through a chamber to produce a partial vacuum in said chamber, admitting air to said chamber through a restricted orifice and incorporating said air in the liquid stream, restricting and projecting the liquid carrying medium as a second high velocity jet, admixing granular abrasive with the second high velocity jet, and projecting the liquid carrying medium and admixed air and abrasive as a high velocity jet.

18. The method of projecting abrasive material comprising the steps of subjecting a supply of water to high pressure, restricting the flow of water to a high velocity jet, restricting the amount and pressure of air surrounding the jet so as to admix with the jet a controlled amount of rarefied air, restricting and reprojecting water and admixed air through a slurry of admixed water and granular abrasive, and projecting the water, air, and granular abrasive as a high velocity jet.

19. The method of cleaning or cutting with an abrasive material which comprises the steps of admixing liquid with a supply of granular abrasive, subjecting a liquid carrying medium to high pressure, projecting the liquid carrying medium as a high velocity jet, admixing air with the projected jet of liquid carrying medium, reprojecting the liquid carrying medium and admixed air as a second high velocity jet, utilizing the force of the second high velocity jet to pump admixed liquid and granular abrasive, entraining the admixed liquid and granular abrasive in the second high velocity jet, and projecting the liquid carrying medium and entrained granular abrasive and air as a third high velocity jet.

20. The method of cleaning or cutting with an abrasive material which comprises the steps of admixing liquid with a supply of granular abrasive, subjecting a liquid carrying medium to high pressure, projecting the liquid carrying medium as a high velocity jet, admixing air with the projected jet of liquid carrying medium, restricting and projecting the liquid carrying medium and admixed air as a second high velocity jet, pumping the admixed liquid and granular abrasive by the force of the second jet, entraining the admixed liquid and granular abrasive in the second jet, projecting the liquid carrying medium and entrained granular abrasive as a high velocity jet, and reclaiming and reusing the granular abrasive.

21. The method of cleaning or cutting with an abrasive material which comprises the steps of admixing liquid with a supply of granular abrasive, subjecting a liquid carrying medium to high pressure, projecting the liquid carrying medium as a high velocity jet, admixing air with the projected jet of liquid carrying medium, restricting and projecting the liquid carrying medium and admixed air as a second high velocity jet, pumping the admixed liquid and granular abrasive by the force of the second jet, entraining the admixed liquid and granular abrasive in the second jet, projecting the liquid carrying medium and entrained granular abrasive as a high velocity jet, and screening, reclaiming, and reusing the granular abrasive.

22. The method of cleaning or cutting with an abrasive material which comprises the steps of admixing liquid with a supply of granular abrasive, subjecting a liquid carrying medium to high pressure, projecting the liquid carrying medium as a high velocity jet, admixing air with the projected jet of liquid carrying medium, restricting and projecting the liquid carrying medium and admixed air as a second high velocity jet, pumping the admixed liquid and granular abrasive by the force of the second jet, entraining the admixed liquid and granular abrasive in the second jet, projecting the liquid carrying medium and entrained granular abrasive as a high velocity jet, washing the granular abrasive with the liquid carrying medium, and reclaiming and reusing the granular abrasive.

23. The method of cleaning or cutting with an abrasive material which comprises the steps of admixing liquid with a supply of granular abrasive, subjecting a liquid carrying medium to high pressure, projecting the liquid carrying medium as a high velocity jet, admixing air with the projected jet of liquid carrying medium, restricting and projecting the liquid carrying medium and admixed air as a second high velocity jet, pumping the admixed liquid and granular abrasive by the force of the second jet, entraining the admixed liquid and granular abrasive in the second jet, projecting the liquid carrying medium and entrained granular abrasive as a high velocity jet, washing the granular abrasive with the liquid carrying medium, screening, reclaiming and reusing the granular abrasive, and draining off excess liquid from the reclaimed abrasive material.

24. In an abrading gun adapted to be utilized with a supply of liquid under high pressure so that said liquid provides a carrying and motivating medium for abrasive material, the combination comprising a body including three spaced and axially aligned nozzles and providing chambers at each end of the intermediate nozzle, a liquid input connection communicating with one of the end nozzles so that liquid is projected from each of the nozzles and through each of the chambers as a high velocity jet, an adjustable valve for admitting a controlled amount of air only to the chamber between the intermediate nozzle and said one of the end nozzles for controlling the spread of the high velocity jet from the last nozzle from which the liquid is projected, and means communicating with the other of the chambers for introducing a sand slurry into the chamber for entrainment in the said high velocity jet therein.

25. In an abrading gun adapted to be utilized with a supply of liquid under high pressure so that said liquid provides a carrying and motivating medium for abrasive material, the combination comprising a body including three spaced and axially aligned nozzles and providing chambers at each end of the intermediate nozzle, a liquid input connection communicating with one of the end nozzles so that liquid is projected from each of the nozzles and through each of the chambers as a high velocity jet, two of said axially aligned nozzles having a larger opening therein than the preceding nozzle through which the liquid passes, an adjustable valve for admitting a controlled amount of air only to the chamber between the intermediate nozzle and said one of the end nozzles for controlling the spread of the high velocity jet from the last nozzle from which the liquid is projected, and means communicating with the other of the chambers for introducing a sand slurry into the chamber for entrainment in the said high velocity jet therein.

26. The method of cleaning or cutting with an abrasive material which comprises the steps of admixing a liquid with a supply of granular abrasive, causing the mixture of liquid and granular abrasive to flow from the lower part of the mixture body into a feeder space, restricting the flow of the mixture between the mixture body and the feeder space, subjecting a liquid carrying medium to high pressure, projecting the liquid carrying medium as a high velocity jet, utilizing the force of the high velocity jet to produce a partial vacuum, subjecting the feeder space to said partial vacuum to cause the mixture therein to flow toward the jet, entraining the mixture from the feeder space in the jet, and projecting the jet and entrained abrasive as a cleaning and cutting jet.

27. The method of producing a high velocity liquid jet having entrained granular abrasive material and liquid in a substantially quiescent storage space, flowing abrasive and liquid by gravity from the lower part of the storage space to a feeder space, restricting the flow between the storage space and feeder space, passing a high velocity liquid jet through a chamber to produce a partial vacuum therein, causing the mixture to flow from the feeder space into the chamber under the influence of said partial vacuum, causing the mixture to be entrained in the jet in the chamber, and causing the jet and entrained abrasive to be projected from the chamber as said high velocity liquid jet having entrained granular abrasive material therein.

LESLIE L. TIRRELL.

REFERENCES CITED

The following references are of record in the file of this patent:

UNITED STATES PATENTS

| Number | Name | Date |
|---|---|---|
| 819,922 | Radell | May 8, 1906 |
| 999,485 | Carolin | Aug. 1, 1911 |
| 1,940,539 | Fritsche | Dec. 19, 1933 |
| 2,040,715 | Smith | May 12, 1936 |
| 2,071,472 | Pletcher | Feb. 23, 1937 |